(12) United States Patent
Kemp

(10) Patent No.: US 8,580,085 B2
(45) Date of Patent: Nov. 12, 2013

(54) SYSTEMS AND METHODS FOR WATER DISTILLATION

(75) Inventor: Hillery Thomas Kemp, Many, LA (US)

(73) Assignee: Kll, Inc., Richmond, IN (US)

( * ) Notice: Subject to any disclaimer, the term of this patent is extended or adjusted under 35 U.S.C. 154(b) by 338 days.

(21) Appl. No.: 12/904,331

(22) Filed: Oct. 14, 2010

(65) Prior Publication Data

US 2011/0024281 A1 Feb. 3, 2011

Related U.S. Application Data

(63) Continuation-in-part of application No. 12/254,487, filed on Oct. 20, 2008, now Pat. No. 8,088,257.

(60) Provisional application No. 61/000,229, filed on Oct. 25, 2007, provisional application No. 61/252,017, filed on Oct. 15, 2009, provisional application No. 61/374,769, filed on Aug. 18, 2010.

(51) Int. Cl.
*B01D 1/02* (2006.01)
*B01D 1/04* (2006.01)
*C02F 1/14* (2006.01)

(52) U.S. Cl.
USPC .......... 203/10; 203/98; 203/100; 203/DIG. 1; 202/234; 202/237; 202/185.5

(58) Field of Classification Search
USPC .................. 203/1, 7, 10, 98, 100, DIG. 1; 202/185.5, 234, 237
See application file for complete search history.

(56) References Cited

U.S. PATENT DOCUMENTS

| | | | |
|---|---|---|---|
| 3,607,670 A | 9/1971 | King | |
| 3,649,163 A | 3/1972 | McCusker | |
| 3,930,958 A | 1/1976 | Marvichi | |
| 3,992,246 A | 11/1976 | Welch | |
| 4,235,679 A | 11/1980 | Swaidan | |
| 4,363,703 A * | 12/1982 | ElDifrawi et al. | 203/10 |
| 4,383,891 A * | 5/1983 | Clavier | 202/234 |
| 4,504,362 A | 3/1985 | Kruse | |
| 4,563,248 A | 1/1986 | Anderson | |
| 4,982,782 A | 1/1991 | Albers | |
| 5,067,272 A | 11/1991 | Constantz | |
| 5,158,650 A | 10/1992 | Wilkerson | |

(Continued)

FOREIGN PATENT DOCUMENTS

| | | |
|---|---|---|
| JP | 2001-070184 | 3/1989 |
| JP | 2005-057272 A | 3/1993 |
| WO | WO 85/04159 | 9/1985 |

OTHER PUBLICATIONS

Office Action for U.S. Appl. No. 12/254,487, dated Jul. 11, 2011.

(Continued)

*Primary Examiner* — Virginia Manoharan
(74) *Attorney, Agent, or Firm* — Woodard, Emhardt, Moriarty, McNett & Henry LLP

(57) ABSTRACT

The invention is generally directed to solar distillation methods and systems for recovering potable water from non-potable water. In certain embodiments, a process for water distillation includes a cycled arrangement, alternating between a day cycle and a night cycle to enhance the yield of potable water. Additionally, in certain embodiments, the system includes a solar still having a design and orientation to maximize solar energy capture.

17 Claims, 8 Drawing Sheets

(56) References Cited

U.S. PATENT DOCUMENTS

| | | | |
|---|---|---|---|
| 5,281,310 A | 1/1994 | Djelovah et al. | |
| 5,421,962 A | 6/1995 | Shvarts et al. | |
| 5,628,879 A | 5/1997 | Woodruff | |
| 5,744,008 A | 4/1998 | Craven | |
| 5,840,159 A | 11/1998 | Rosenblad | |
| 6,165,326 A * | 12/2000 | Markopulos | 202/234 |
| 6,274,004 B1 | 8/2001 | Anderson | |
| 6,290,819 B1 * | 9/2001 | Land | 202/83 |
| 6,342,127 B1 | 1/2002 | Possidento | |
| 6,440,275 B1 | 8/2002 | Domen | |
| 6,797,124 B2 | 9/2004 | Ludwig | |
| 6,868,690 B2 | 3/2005 | Faqih | |
| 7,008,515 B1 | 3/2006 | Husson et al. | |
| 7,416,643 B2 | 8/2008 | Yonover | |
| 7,494,572 B2 | 2/2009 | Tonkin et al. | |
| 7,857,945 B2 | 12/2010 | Al-Garni et al. | |
| 8,196,422 B2 * | 6/2012 | Ritchey | 62/235.1 |
| 2004/0060808 A1 | 4/2004 | La Violette | |
| 2005/0189209 A1 | 9/2005 | Craven | |
| 2008/0008049 A1 * | 1/2008 | Landsberg | 368/15 |
| 2009/0107831 A1 | 4/2009 | Kemp | |

OTHER PUBLICATIONS

PCT International Search Report, PCT/US2010/052801, date of mailing Jun. 24, 2011, 5 pages.

PCT Written Opinion of the International Searching Authority, PCT/US2010/052801, dated of mailing Jun. 24, 2011, 4 pages.

"Climatic Causes of Aridity," Power Point Presentation from Chapter 2 of Desert Meteorology by Thomas T. Warner, Cambridge University Press, 2004.

Giseppe Fiorenza, T., Techno-Economic Evaluation of a Solar Powered Water Desalination Plant in L. Rizzuit et al. (eds.), Solar Deslatination for the 21st Century (Springer, Netherlands, 2007), pp. 33-41.

Korovessis, Nicholas A., "Solar Saltwork Productions Process Evolution—Wetland Function," Proceedings of the Post Conference Symposium "Saltworks": Preserving Saline Coastal Ecosystems—Global NEST Samos, 1999.

PCT International Search Report, PCT/US2008/080635, date of mailing May 29, 2009, 3 pages.

PCT Written Opinion of the International Searching Authority, PCT/US2008/080635, dated of mailing May 29, 2009, 3 pages.

Schley, W. et. al. Of Post, Buckley, Schuh & Jernigan, Inc., "Cost Effectiveness of Evaporative Treatment Processes," Special Publication SJ96-SP12, prepared for St. Johns River Water Management District, 1996.

U.S. Congress, Office of Technology Assesment, Using Desalintation Technologies for Water Treatment, OTA-BP-O-46 (Washington, DC: U.S. Government Printing Office, Mar. 1988).

* cited by examiner

SYSTEMS AND METHODS FOR WATER DISTILLATION

CROSS-REFERENCE TO RELATED APPLICATIONS

This application is a continuation-in-part of U.S. application Ser. No. 12/254,487, filed Oct. 20, 2008, issued Jan. 3, 2012 under U.S. Pat. No. 8,088,257, which claims the benefit of U.S. Provisional Application No. 61/000,229, filed Oct. 25, 2007, which are both hereby incorporated by reference. This application claims the benefit of U.S. Provisional Application No. 61/252,017, filed Oct. 15, 2009, and U.S. Provisional Application No. 61/374,769, filed Aug. 18, 2010, which are both hereby incorporated by reference.

FIELD OF THE INVENTION

The present disclosure relates to systems and methods for water distillation, and more specifically, to a day and night cycled arrangement for distilling water and to a solar distillation still having a heating surface orientation designed to maximize solar energy capture and thereby enhance the yield of potable water in a distillation process.

BACKGROUND OF THE DISCLOSURE

Rain patterns throughout the world are not readily predictable or reliable and irrigation from ground or riparian water is often the main source of agricultural water. Similarly, industrial and municipal water systems rely on these sources. Furthermore, hydraulic models predict diminishing water availability per individual over the next 25-50 years, with the greatest losses being in those areas now considered arid or semiarid. Desertification, the process of non-dessert becoming desert, is increasing, not only in China and north Africa, but in the United States where more than 30% of the land west of the Mississippi shows signs of desertification. Thus, even on our blue planet which is covered over three fourths of its surface with water, less than 1% is potable.

The present system is especially suited to producing fresh or potable water from sea water and other salty waters in desert and semi-desert areas as an example. It is applicable in many other areas as well. The present system may be implemented to provide large quantities of water from salty water to supply irrigation, industrial and municipal water by using inexpensive material, already widely available at low costs throughout the world with minimal energy required and simple operation and upkeep.

Attempts have been made in the past to provide solar stills capable of producing relatively large quantities of potable water. These attempts have proven to be costly and inefficient and have failed at producing large quantities of potable water. Therefore, a need exists for an improved solar distillation system.

SUMMARY OF THE INVENTION

In certain embodiments, the present disclosure is directed to a process for water distillation having a day cycle and a night cycle in a cycled arrangement. The process for distillation may be utilized in connection with a variety of appropriate solar distillation stills. The still is used to derive potable water from a supply of non-potable water, such as to derive fresh drinking water from saline water, sea water, wastewater, or contaminated fresh water sources, as examples. An example distillation still (and its various embodiments, options and alternatives) is described in U.S. patent application Ser. No. 12/254,487, filed Oct. 20, 2008, issued Jan. 3, 2012 under U.S. Pat. No. 8,088,257, which is hereby incorporated by reference. Another example distillation still (and its various embodiments, options and alternatives) which may optionally be used with the day and night cycled arrangement is described herein with respect to FIGS. 4-8. In operation, the day and night cycled arrangement involves a day cycle for distilling potable water from non-potable water using solar energy and also a night cycle to enhance the yield of potable water from the non-potable water.

DESCRIPTION OF ILLUSTRATED EMBODIMENTS

Figure 1:
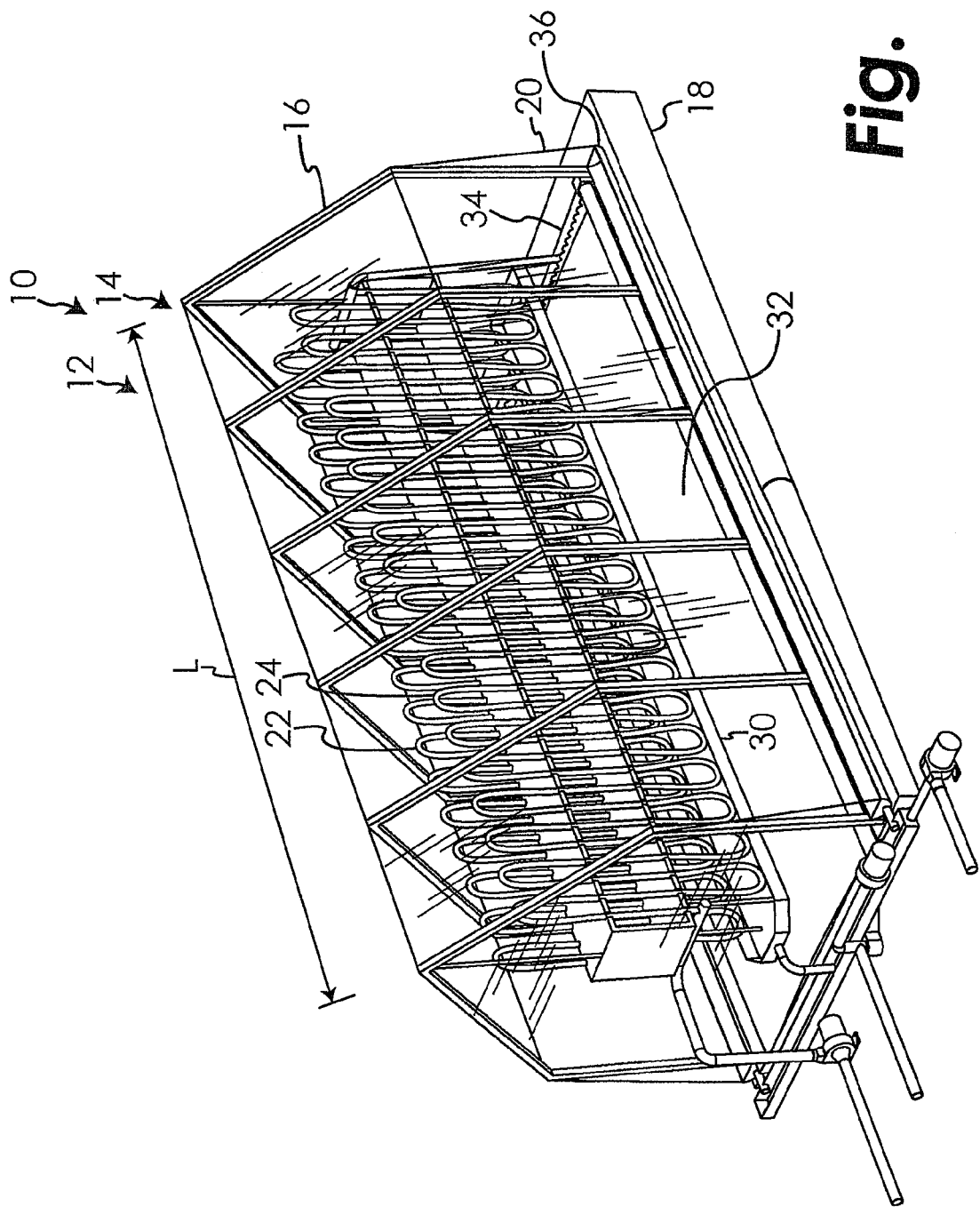
FIG. 1 is a perspective view of a distillation system according to an embodiment of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

In certain embodiments, the present disclosure is directed to a process for water distillation having a day cycle and a night cycle in a cycled arrangement. The process for distillation may be utilized in connection with a variety of appropriate solar distillation stills. The still is used to derive potable water from a supply of non-potable water, such as to derive fresh drinking water from saline water, sea water, wastewater, or contaminated fresh water sources, as examples. An example distillation still (and its various embodiments, options and alternatives) is described in U.S. patent application Ser. No. 12/254,487, filed Oct. 20, 2008, issued Jan. 3, 2012 under U.S. Pat. No. 8,088,257, which is hereby incorporated by reference. Another example distillation still (and its various embodiments, options and alternatives) which may optionally be used with the day and night cycled arrangement is described herein with respect to FIGS. 4-8. In operation, the day and night cycled arrangement involves a day cycle for distilling potable water from non-potable water using solar energy and also a night cycle to enhance the yield of potable water from the non-potable water.

A brief overview of an example solar distillation system which can optionally be used with the day and night cycled arrangement discussed herein will be described with respect to FIG. 1. Illustrated in FIG. 1 is a distillation system 10 including a condensation subsystem, or solar still 12. Still 12 includes a housing 14 defined by a plurality of frame supports 16 extending substantially along the length L of the still 12. In optional embodiments, the supports 16 may engage an inclined base member 18 which supports many of the components of system 10 in an angled or inclined arrangement to allow for gravitational flow of water. Housing 14 also includes a solar light-transmitting roof top, such as the illustrated canopy 20. In certain embodiments, canopy 20 is mounted, secured or otherwise engaged with one or more other components within the still 12 in a manner so as to maintain a substantially air tight environment with the still.

In preferred embodiments of the present disclosure, at least one tubular member is at least partially housed within the solar still 12 underneath the solar light-transmitting roof top canopy 20, whereby heat transfer occurring within the solar still causes potable water to condense on the outside of the tubular member and drip into an appropriate collection device, such as trough 30 as an example. The tubular member serves as the condensing element to collect potable water vaporized from a heating surface and/or from hot water flow, as will be discussed in greater detail below, and can also serve as a conduit for cool or cold non-potable water during a daytime cycle of the cycled arrangement discussed in greater detail below. As illustrated, potable water collection trough 30 is positioned below the illustrated tubular members 22 and 24 in an aligned fashion so that potable water condensing on the outside of tubular members 22 and 24 will drip into trough 30 for collection.

Still 12 also includes an inclined heating surface 32 positioned below the illustrated tubular members 22 and 24 and the collection trough 30. In certain embodiments, water flow down the inclined heating surface 32 may be continually recycled, such that water exiting the lower end of the heating surface is pumped back to the raised end of the heating surface and released. In optionally embodiments, and as part of a daytime cycle, all or a portion of the water exiting the tubular members 22 and 24 may be released onto the raised end of heating surface 32 and caused to flow down the surface. During a daytime cycle, the water flowing down the heating surface 32 may be solar heated whereby a portion of the water evaporates and condenses as potable water on the outside of the tubular members. During a nighttime cycle, warm or hot water from a water source may be released onto the raised end of the heating surface 32 and caused to flow down the surface, whereby the temperature differential between the flow of water and the surfaces within still 12, such as the cooler inside surfaces of canopy 20, allows for a portion of the water to evaporate and condense as potable water primarily on the underside or inside surfaces of the canopy 20, which can be collected via appropriate collection means. Potentially, a small portion of the potable water may condense on the outside surfaces of the tubular members 22 and 24, in certain embodiments.

Surface 32 may be composed of a variety of appropriate materials, including a plastic material as an example which is black in color to enhance the heating and evaporation processes. Additionally, as illustrated the heating surface 32 may be slightly arched along its width to urge the water flowing down the surface to spread across the width.

Additionally, the still 12 may optionally include a device to evenly distribute liquid onto the heating surface 32, such as the example illustrated liquid distributor 34. Further, the still 12 may optionally include means for collecting potable water which condenses on the canopy 20, such as the example illustrated side gutters 36. System 10 may also include one or more pump subsystems for the transport of non-potable and potable water, including pumping non-potable water into the still, recycling non-potable water within the still, pumping non-potable purge water out of the still, and pumping potable collected water out of the still. Examples of pump subsystems which may be included in system 10 are illustrated in FIG. 1. In an arrangement suitable for use with respect to process 100 described below, system 10 may be arranged in communication with a warm or hot non-potable water source and a cool or cold non-potable water source (the water sources are not shown in FIG. 1 for ease of illustration).

Figure 2:
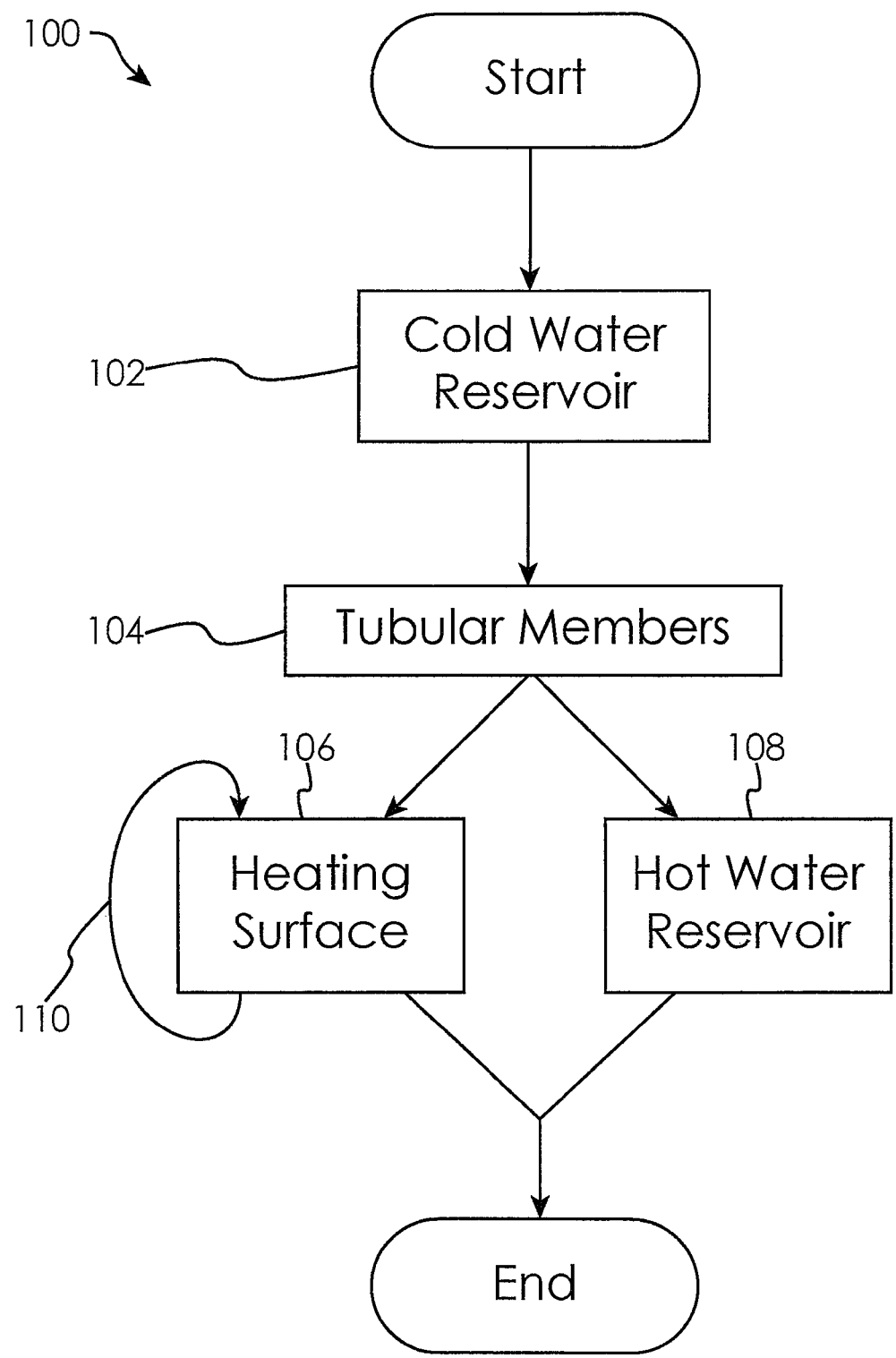
FIGS. 2 and 3 are flow charts describing aspects of distillation processes according to embodiments of the present disclosure.
Figure 3:
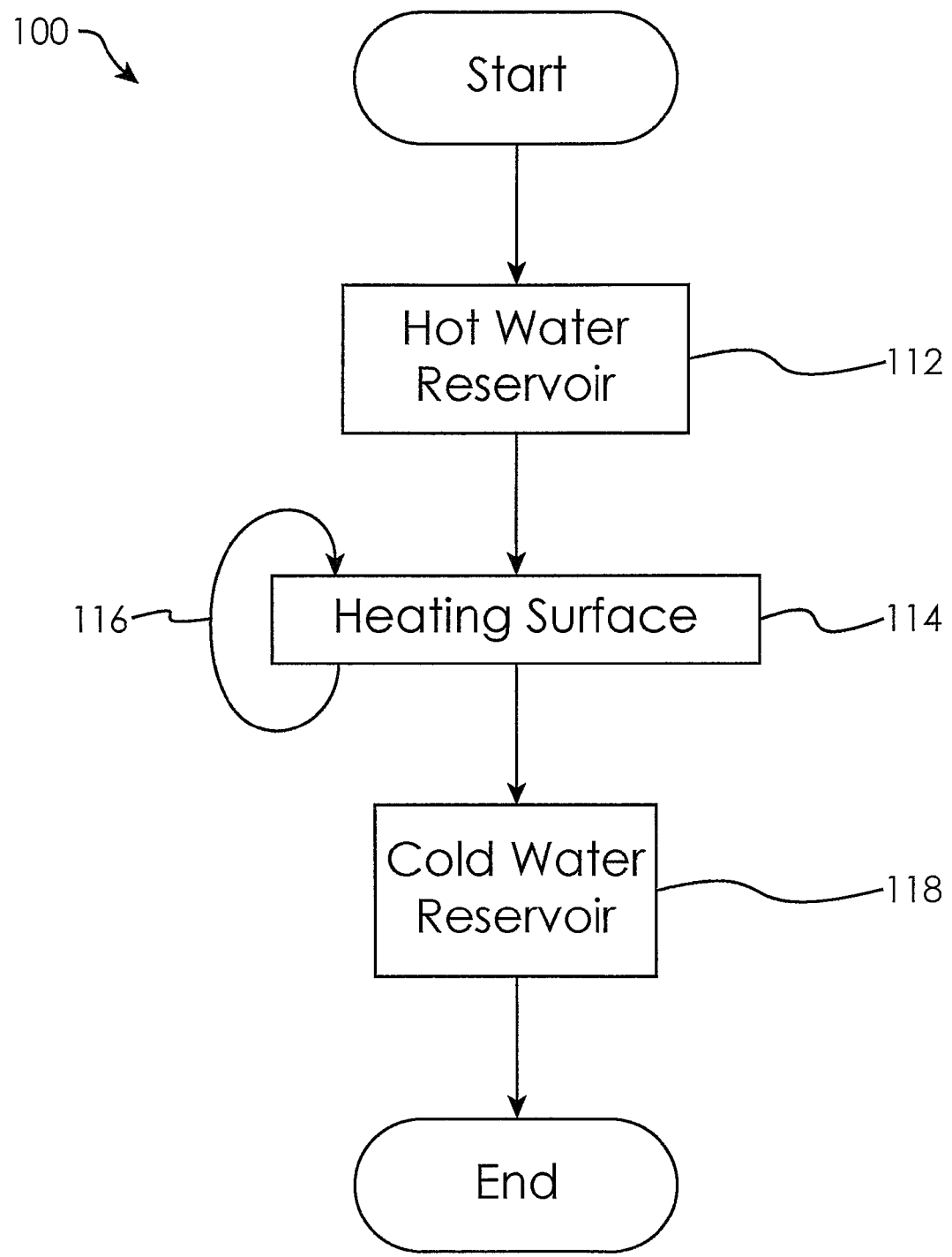

FIGS. 2 and 3 are flow charts illustrating the flow of non-potable water with respect to the day and night cycles, respectively, of the cycled arrangement disclosed herein. The flow of non-potable water discussed with respect to FIGS. 2 and 3 may be continual throughout the respective day and night cycles, or alternately may be segmented, interrupted, intermittent, and/or pulsed flow patterns. References herein to the "day cycle" or "daytime cycle" are intended to include any type of heated or solar-energized cycle, which is not necessarily during the daytime or typical day light hours. Similarly, references herein to the "night cycle" or "nighttime cycle" are intended to include any type of unheated cycle, which is not necessarily during the nighttime or typical night time hours. Additionally, during the discussion of process 100, reference is made to system 10 and still 12 and it's components; however, it should be appreciated that process 100 may be utilized with a variety of appropriate still configurations and arrangements as would occur to one of ordinary skill in the art. Further, the present disclosure contemplates that the various system embodiments and processes discussed herein may be provided and used in association with a variety of water recovery procedures in which it would be desirable to recover potable water from non-potable water.

Generally referring to FIGS. 1-3, implementation, operation and use of system 10 will now be discussed in greater detail with respect to process 100 embodying the day and night cycled arrangement. During operation of the day cycle of process 100 (see FIG. 2), cold non-potable water, such as salt water, is drawn into the still 12 from a cold water reservoir, typically with a pump, at step 102. As discussed above, the cold non-potable water is pumped through the solar-heated still structure within the one or more tubular members, such as tubular members 22 and 24, at step 104. As the cold water passes through the tubular members, the water temperature rises due to conduction through the tubular members and correspondingly draws heat from the tubular members, thereby cooling the outer surfaces of the tubular members. In other embodiments, alternative means may be employed to cool the outer surfaces of the tubular members, such as through cold air or gas flow through the tubular members for example.

The non-potable water exits the tubular members, with all or a majority of the water being directed to the hot water reservoir at step 108. The output of heated non-potable water purged to the hot water reservoir is a byproduct from the operation of system 10 during the day cycle. The hot water reservoir is preferably arranged to maintain the heat of the water and/or to increase water temperature through solar heating during the day. In certain embodiments, a greenhouse type of structure can enclose the hot water reservoir to contain, maintain, and increase the temperature of the hot water.

Optionally, a small portion of the water exiting the tubular members may be released onto the heating surface 32 at its raised end, at step 106, to create gravitational flow of non-potable water along the heating surface. In alternative embodiments, water may be drawn from a hot water reservoir and released onto the heating surface to create non-potable water flow along the heating surface. The heating surface 32, heated by solar energy, further raises the temperature of the non-potable water flowing therealong, causing a portion of the water to evaporate within the enclosed still structure. When the evaporated water encounters the colder surfaces of tubular members 22 and 24 and/or the canopy inside surfaces, vapor condenses on the surfaces as cooler, potable water. The condensed water preferably is collected in trough 30 and/or gutters 36 and transported out of the still via an output conduit system for use.

The non-potable water which travels to the lower end of the heating surface 32 during the day cycle may be returned to the raised end of the heating surface to be recycled within the still to yield additional water, as represented by numeral 110 in FIG. 2. During the day cycle, the portion of the non-potable water flow which is newly introduced at the upper end of the heating surface 32 may be controlled to mix with and dilute the recycled non-potable water in the still to maintain the salinity of the non-potable water flow along the heating surface so that the salinity does not exceed a desired concentration. In alternative embodiments, only a portion of the non-potable water traveling along the heating surface 32 is recycled within the still, with the remaining non-potable water being purged to a hot water reservoir.

At the end of a day cycle, the input of cold non-potable water from the cold water reservoir is discontinued typically in conjunction with a substantial drop in temperature of the ambient air, for example due to sundown. Thereafter, the night cycle portion of process 100 begins. In certain embodiments, the transition between the day and night cycle involves a minimal or insubstantial break in the process flow. In other embodiments, a substantial break in process flow may occur at the transition between the day and night cycles.

During operation of the night cycle of process 100 (see FIG. 3), heated non-potable water from the hot water reservoir is fed into to the solar distillation still 12 at step 112, such as by pumping or using a gravity flow. The heated water is introduced at the upper end of the still 12 onto the raised end of heating surface 32, at step 114 in FIG. 3, and is distributed to travel downward along the heating surface as a result of gravitational force. Heating surface 32 is not heated at this point. Due to the substantial change in ambient temperature after the sun goes down or otherwise due to a reduction in heat, the heated water travelling through the still 12 now has a temperature substantially above the temperature of the cooler air outside of the still. As the heated water travels downward along heating surface 32, the temperature differential causes further evaporation of potable water within the still. The evaporated potable water can be captured as condensation on the cooled surfaces of the roof and walls of canopy 20 and potentially as condensation upon the cooled surfaces of tubular members 22 and 24. After passing through the still, the remaining non-potable water, at a cooler temperature, is collected at the bottom of the heating surface and directed to a cold water reservoir at step 118, optionally using pumping or a gravity flow. In certain alternative embodiments, the cooler water can be directly discharged or purged as waste from the process to a different location. In other alternative embodiments, a portion of the water at the bottom of the heating surface can be recycled within the still 12 and returned for distribution at the top of the heating surface, as shown at numeral 116 in FIG. 3.

In certain embodiments, cool or cold water in the cold water reservoir will continue to cool during the night time hours and can optionally be encouraged to remain at a lower temperature, for example using insulation or shade when the day time begins and ambient temperatures begin to rise. During the next day cycle, the cooled water can optionally be fed back into the solar still as input, beginning again at step 102 in FIG. 2. The day and night cycles may continue in a cycled arrangement for a determined length of time, until a desired quantity of potable water has been received, and/or until a desired salt concentration or scaling compound concentration in the non-potable water has been reached. In other embodiments, the cycled arrangement may continue for an indeterminate length of time.

Suitable valves and pumps may be used in conjunction with the process steps herein. Process 100 may include one or more pump subsystems for the transport of non-potable and potable water. More specifically, one or more valves and/or pump subsystems may be used to allow or prohibit the flow of non-potable water into and out of the tubular members 22 and 24, onto the heating surface 32, and/or recycled through the still 12. Additionally, appropriate valves and/or pump subsystems may be used to control the flow of non-potable water into and out of the cold and hot water reservoirs as desired or necessary to the operation of the process. Further details regarding certain applicable and relevant aspects of the operation of still 12 which are not repeated herein for the sake of brevity, including various options and alternatives, can be found in U.S. patent application Ser. No. 12/254,487, filed Oct. 20, 2008, which is hereby incorporated by reference.

The steps of process 100 may be controlled as desired or programmed, optionally using manual or automated controls. Automated controls can optionally be time or light controlled or may be associated with sensors to start or stop certain steps of the process based on sensed conditions such as the temperatures or salinity concentrations of the water reservoirs, the ambient temperature or an algorithm based on the temperature differentials between one or more of the relevant water reservoirs, the still and the ambient temperature. A controller may also incorporate sensors and/or control commands to control the valves and to prohibit undesirable combinations of valve and pump flows.

In certain embodiments, system 10 may include arrangements, such as pumps, to recycle non-potable water within system 10 within the day or night cycle period to further heat or cool the water and to correspondingly increase the potable water yield. However, the efficiency of the potable water yield will decrease as the temperature differential decreases and as the concentration of non-potable elements, such as salinity, of the non-potable water increases.

In certain embodiments, it may be desirable to purge and/or replenish water within the system 10 due to the increase in concentrations of scaling compounds and/or salinity in the non-potable water. More specifically, after each cycle or process portion, the non-potable water in the hot and/or cold water reservoir will likely have a higher concentration of scaling compounds and/or a higher salinity concentration than the initial non-potable water entering the still. If not diluted with new water, the salinity content and/or concentrations of scaling compounds will continue to rise with each cycle or process portion, creating a limit on a desirable number of cycles before maximum useful concentrations are reached. At that point, if not before, the non-potable water may be discharged, diluted and/or replenished with new water. In certain embodiments, it is preferable to purge and/or replenish non-potable water at the coldest point possible or practical to conserve or retain as much heat energy or solar energy as possible within the system. As one example, non-potable water may be periodically removed from the cold water reservoir and purged or otherwise discharged as waste to an appropriate location, with new non-potable water added to the cold water reservoir to replenish the supply. In other embodiments, it may also be desirable to purge non-potable water to assist in controlling the total liquid levels within the process, including the still and the hot and cold water reservoirs.

As mentioned above, another example distillation still (and its various embodiments, options and alternatives) is described herein with respect to FIGS. 4-8, the still being optionally capable of use with the day and night cycled arrangement described herein. Illustrated in FIGS. 4-8 is a process for distillation 200 which includes a condensation subsystem, such as a solar distillation still 212 capable of recovering potable water from non-potable water. The still 212 may operate in conjunction with non-potable water sources, such as the illustrated cold water reservoir 202 and hot water reservoir 204. However, it should be appreciated that still 212 may operate in conjunction with other non-potable water supplies, the illustrated reservoirs being just one non-limiting example. In certain embodiments, still 212 may be designed and orientated to maximize solar energy capture along its heating surface.

Figure 4:
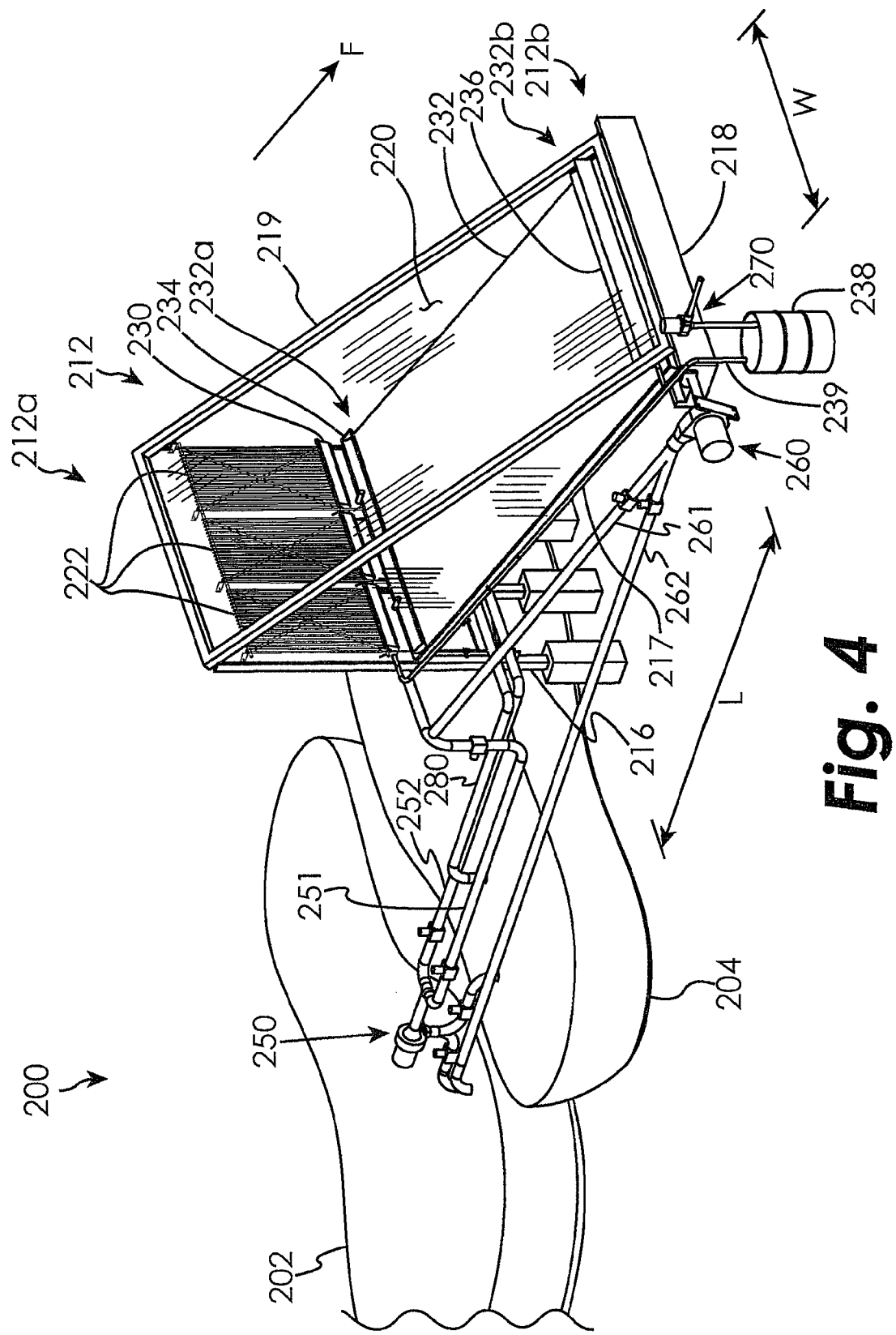
FIG. 4 is a perspective view of a distillation system according to another embodiment of the present disclosure.

Solar still 212 includes a first end 212a, an opposite second end 212b, a length L extending along a longitudinal axis, and a width W extending along a width axis (see FIG. 4). Solar still 12 includes a base housing structure to provide support which, as in the particular illustrated embodiment, may include a plurality of column supports 216 at first end 212a, a ground support 218 at second end 212b, one or more longitudinal supports 217 extending there between, and a top frame 219 (see FIGS. 4 and 5).

Figure 5:
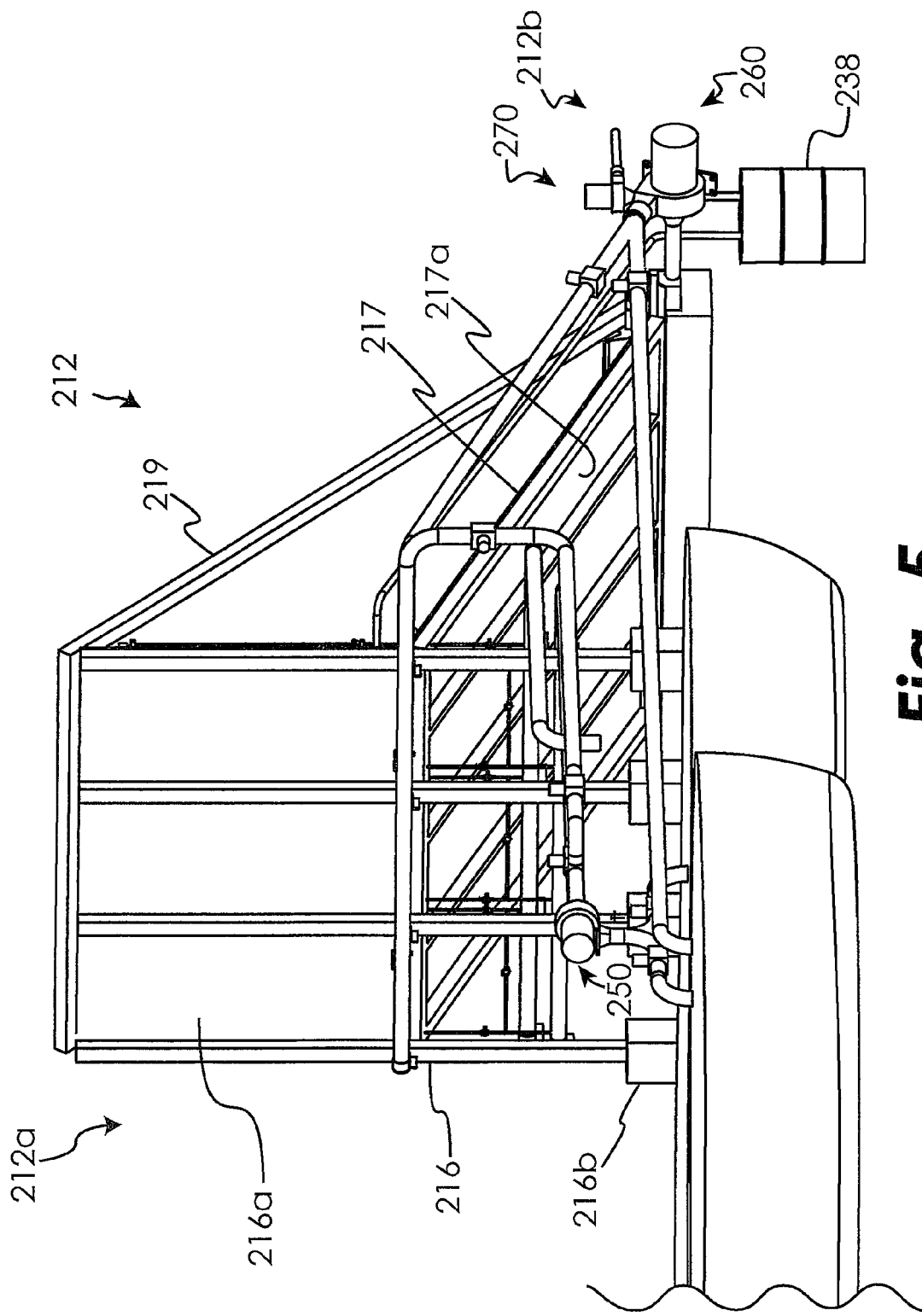
FIG. 5 is a close-up perspective view of a portion of the distillation system of FIG. 4.

As shown in FIG. 5, still 212 may optionally include a panel engaged with column supports 216 to create a back wall for the still, such as the illustrated back wall panel 216a. Similarly, the still 212 may optionally include a panel engaged with longitudinal supports 217 to create a floor for the still, such as the illustrated floor panel 217a. Further, the column supports 216 may optionally be set in foundation members or footings 216b. The illustrated size, spacing, configuration and arrangement of the base housing structure components can be varied as would occur to one of ordinary skill in the art.

The base housing structure components may be composed of a combination of a variety of appropriate materials, including metal, wood, plastic and/or natural materials. The following are examples of the various appropriate materials which may be used to form the base housing structure components. For example, the panels 216a and 217a may be composed of plywood or a similar material. The footings 216b may be composed of concrete with one or more reinforced steel rods therein, as another non-limiting example. The supports 216 and 217 may be composed of a variety of appropriate materials capable of providing the necessary structural support. In certain embodiments, the supports 216 and 217 are at least partially shielded or protected from ultraviolet ("UV") radiation from the sun and can thus be composed of a material, naturally-occurring or otherwise, which can exhibit sensitivity to UV radiation, such as bamboo for example. To further protect the UV sensitive material, another material such as aluminum foil may be wrapped around to cover the support material and further shield the material from UV radiation.

Solar still 212 also includes a solar light-transmitting roof top, such as the illustrated canopy 220 as one non-limiting example. Canopy 220 is supported on top frame 219 and extends along and substantially covers the length L of solar still 212. Preferably, the canopy 220 in conjunction with other components of the still creates an air tight enclosure to maintain a substantially air tight environment within the still. As such, many of the necessary components for recovering potable water are positioned within the air tight enclosure portion of the still 212. The nature of the design of the still 212 also allows for many of the structural elements to be positioned outside of the air tight enclosure, and thus free from exposure to the relatively high temperature and high humidity conditions within the air tight enclosure portion of the still 212. Accordingly, many of these structural components positioned outside of the air tight enclosure portion may be made with materials which would not otherwise likely maintain integrity upon exposure to conditions occurring within the air tight enclosure portion. The canopy 220 may necessarily define holes or passageways (not shown for clarity) through which components such as pipes or conduits may pass through to transport water to and from the still. It should be appreciated that the canopy may be secured or engaged in a variety of appropriate ways as would occur to one of ordinary skill in the art.

In certain embodiments, the canopy 220 may be composed of a clear plastic film. In a particular embodiment, the canopy 220 may be composed of polyethylene or polypropylene plastic. In other embodiments, the canopy 220 may be composed of a variety of other appropriate materials which are capable of transmitting solar light, including glass as another non-limiting example. It should be appreciated that the arrangement and configuration of the light-transmitting roof top for the solar still is not critical to the present disclosure. Various other arrangements and configurations are possible as would occur to one of ordinary skill in the art. As an example, the structural support elements and canopy may be replaced by a clear (or otherwise solar light-transmitting) plastic housing which is sufficiently rigid to maintain upright positioning.

Optionally, system 200 may include a ventilation system (not shown for ease of illustration) operable to allow for ambient air flow in and out of the solar still 212 and thereby prevent a vacuum occurring inside the solar still and to prevent excess pressure from building up inside the solar still. In certain embodiments, the ventilation system may be coupled with canopy 220. It is contemplated that the ventilation system may be configured, arranged, and incorporated with the solar still 212 in a variety of possible manners and at a variety of possible positions as would occur to one of ordinary skill in the art.

In preferred embodiments of the present disclosure, at least one tubular member is at least partially housed within the solar still underneath the solar light-transmitting roof top, whereby heat transfer occurring within the solar still causes potable water to condense on the outside of the tubular member and drip into an appropriate collection device. In certain embodiments, the tubular member(s) serve as conduits for cool non-potable water to be distilled by serving as the condensing element to collect water vaporized from a heating surface, as will be discussed in greater detail below.

In the particular illustrated embodiment, tubular members 222 are housed within still 212 and extending in an undulating, stretched helical fashion along first end 212a. Each tubular member 222 includes an intake segment 222a to receive non-potable water and an exit segment 222b to release non-potable water (see FIG. 7). The curved nature of the tubular members allows for increased surface area of the tubular members to be provided within the solar still 212 without comprising much additional length. The tubular members may optionally be curved in a variety of other fashions as would occur to one of ordinary skill in the art. In other embodiments, the tubular members may extend substantially straight within the still.

In the particular illustrated embodiment, there are three tubular members 222 provided in the still 212. However, it should be appreciated that the tubular member(s) contemplated by the present disclosure may be arranged in numerous other possible manners as would occur to one of ordinary skill in the art. As an example, the system may include a single tubular member spanning the entire distance of first end 212a. As another example, the tubular members may make multiple passes along first end 212a. The many other possible arrangements are too numerous to list.

The tubular members may be composed of a variety of possible appropriate materials which allow for condensation on the exterior of the members as a result of heat transfer phenomenon. As one non-limiting example, the tubular members may be composed of a plastic material, such as polyethylene. In a particular example embodiment, the tubular members may be composed of cross-linked polyethylene, or PEX. Additionally, the sizing of the tubular members is not critical to the present disclosure, as the size can be adjusted depending on the volume of water to be treated.

Additionally, the tubular members 222 may be positioned within solar still 212 in a variety of possible manners as would occur to one of ordinary skill in the art. In the illustrated embodiment, the tubular members 222 are carried on one or more frames 226 which are suspended from the column supports 216. The example frame 226 includes parallel top and bottom rods around which the tubular members 222 are wrapped. It is contemplated that tubular members can be carried in a variety of other appropriate ways as would occur to one of ordinary skill in the art, with the arrangement of frame 226 being just one non-limiting example. In alternative embodiments, frame 226 is absent and the tubular members 222 are directly suspended from the supports 216 through the use of appropriate fasteners or engagement members. In certain embodiments, it may be desirable to reduce the amount of shadow effect received the floor of the solar still as the shadow may reduce solar heating. As such, it may be desirable to minimize the size of frame 226, if present, to reduce the shadow displayed on the floor of the solar still. It should be appreciated that the manner of suspending or otherwise positioning the tubular members 222 within the solar still 212 is not critical to the present disclosure.

Figure 7:
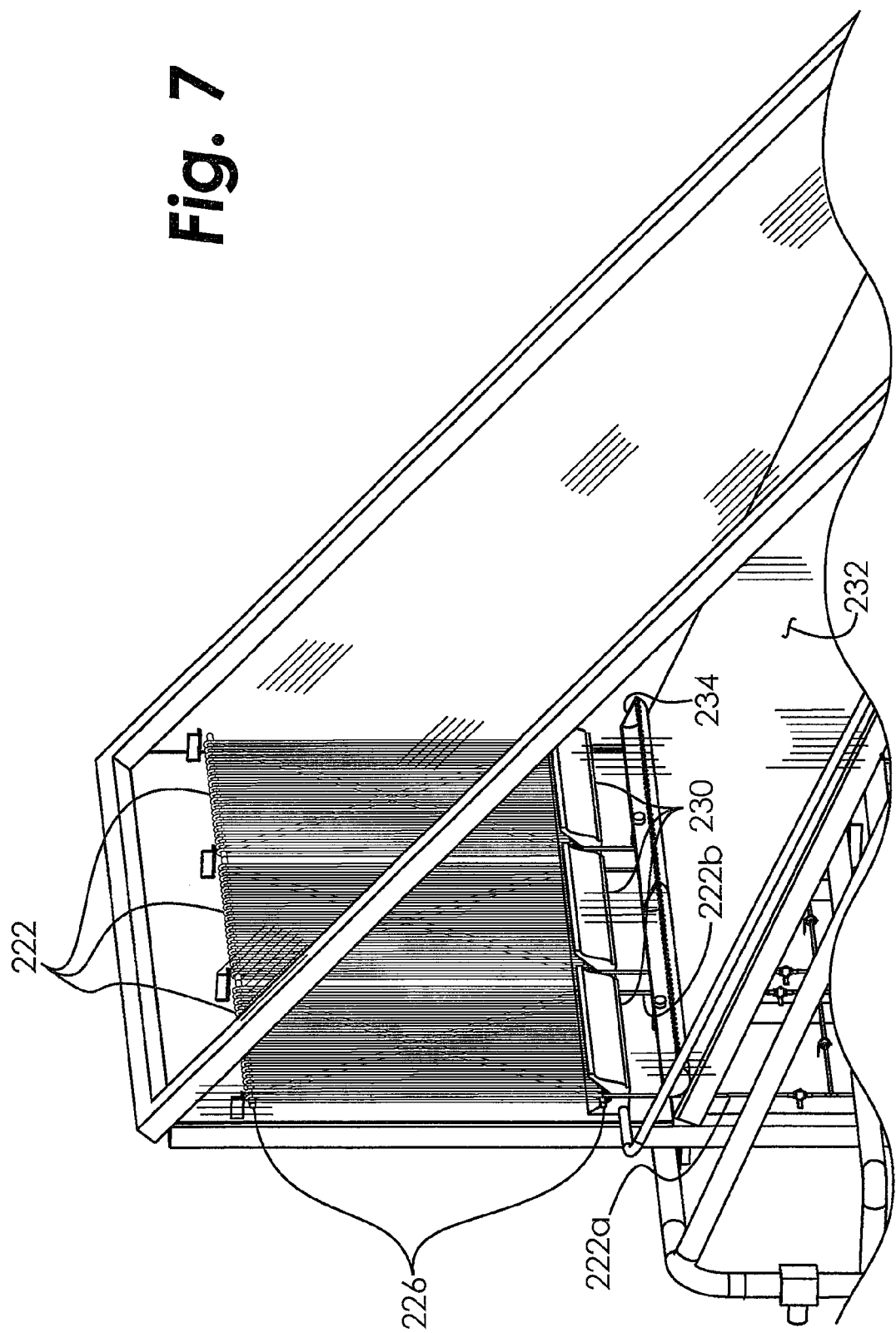
FIG. 7 is a close-up perspective view of a portion of the distillation system of FIG. 4.
Figure 8:
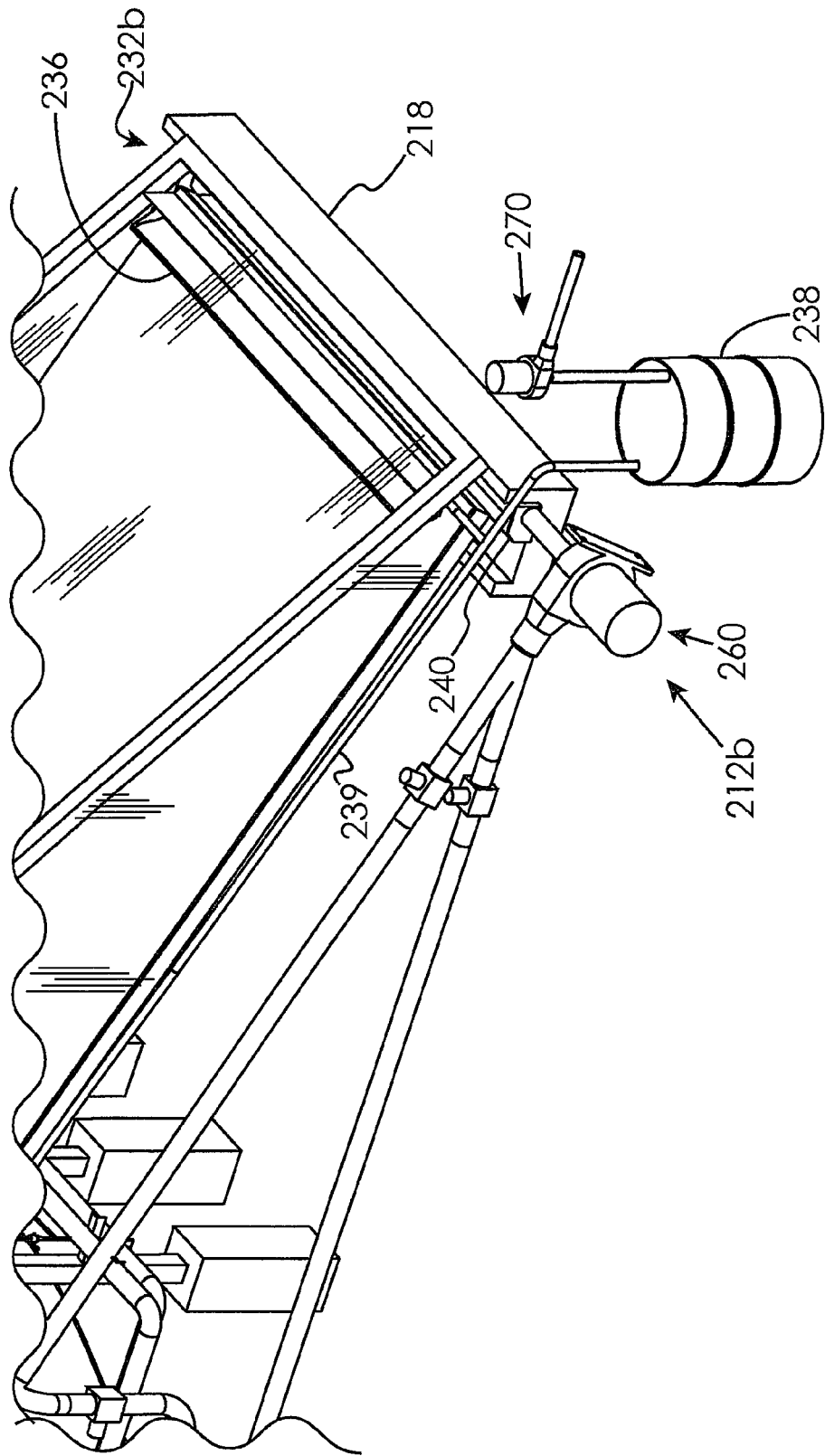
FIG. 8 is a close-up perspective view of a portion of the distillation system of FIG. 4.

System 200 additionally includes potable water collection troughs 230 positioned below the tubular members 222 in an aligned fashion so that potable water condensing on the outside of tubular members 222 will drip into troughs 230 for collection (see FIG. 7). In the illustrated embodiment, troughs 230 are suspended from back wall panel 216a. However, it should be appreciated that the troughs 230 may be positioned and arranged within solar still 212 in numerous other possible ways as would occur to one of ordinary skill in the art, with the illustrated suspension being just one non-limiting example. Additionally, it should also be appreciated that the troughs 230 are just one non-limiting example of the numerous possible collection means contemplated by the present disclosure which could be incorporated into solar still 212 for the collection of condensed water from the outside surface of tubular members 222. The particular design of the collection means is not critical to the present disclosure.

As illustrated, positioned below troughs 230 is a heating surface 232. Heating surface 232 is configured to receive a flow of non-potable water along a flow axis F. Additionally, heating surface 232 may be positioned on floor panel 217a, as illustrated, or may be otherwise positioned on a different appropriate floor structure of the still. As illustrated, the longitudinal supports 217 and floor panel 217a may be inclined such that these components are positioned higher at first end 212a than second end 212b. Accordingly, heating surface 232 may also be inclined based on its positioning on the inclined floor panel and longitudinal supports, creating an upper end 232a and a lower end 232b. In alternative embodiments, heating surface 232 may be inclined by virtue of an alternative mounting or positioning arrangement within the solar still. As one non-limiting example, longitudinal supports 217 (and correspondingly the heating surface 232) may define an incline angle in the range of 20 to 45 degrees from horizontal. However, it should be appreciated that the structural components may be designed to create greater or less inclining of the heating surface 232. The inclination of the heating surface 232 allows for the still 212 to be placed at sites with varying or irregular terrain without disruption to the operation of the system. In certain embodiments, the heating surface 232 may extend substantially the length of the solar still between ends 212a and 212b. However, it should be appreciated that the system components housed within solar still 212 may be arranged in a variety of other appropriate ways.

During a day cycle, non-potable water exiting the tubular members 222 via exit segments 222b may be released onto heating surface 232 at or near upper end 232a and the water is caused to flow down the heating surface 232 due to gravitational force. During operation of a day cycle, the water flowing down surface 232 is solar heated whereby a portion of the water evaporates and condenses as potable water on the outside of the tubular members 222 and/or on the inside surfaces of canopy 220. During a night cycle, non-potable water may be drawn into the still 212 from a hot non-potable water source and released onto heating surface 232 at or near upper end 232a and caused to flow down the heating surface 232 due to gravitational force. During operation of a night cycle, the temperature differential between the flow of water and the surfaces within the still 212, such as the cooler inside surfaces of canopy 220, allows for a portion of the water to evaporate and condense as potable water primarily on the underside or inside surfaces of canopy 220, which can be collected via appropriate collection means. Potentially, a small portion of the potable water may condense on the outside surfaces of the tubular members 222, in certain embodiments. Surface 232 may be composed of a variety of appropriate materials as would occur to one of ordinary skill in the art, including an impermeable plastic material as an example. Additionally, in certain embodiments, the surface 232 may be black in color to enhance the heating and evaporation of the water flowing along the surface.

System 200 may optionally include a device to evenly distribute liquid onto heating surface 232 at or near upper end 232a. The accompanying figures illustrate an example liquid distributor 234 positioned adjacent the upper end 232a of heating surface 232, as best shown in FIG. 7. The illustrated distributor 234 is an open-gutter having a plurality of v-notches across the width of the distributor. The v-notches serve to distribute water which has accumulated in distributor 234 substantially evenly and uniformly across the surface 232. It should be appreciated that the distributor 234 can be configured differently and can include other distribution means as would occur to one of ordinary skill in the art, with the v-notches being just one non-limiting example. In certain embodiments, pipes or conduits lead from the exit segments 222b of tubular members 222 into the distributor 234 to transport water, typically a small portion, exiting the tubular members into the distributor. However, it should be appreciated that a variety of appropriate configurations and arrangements for transferring water may be used.

Figure 6:
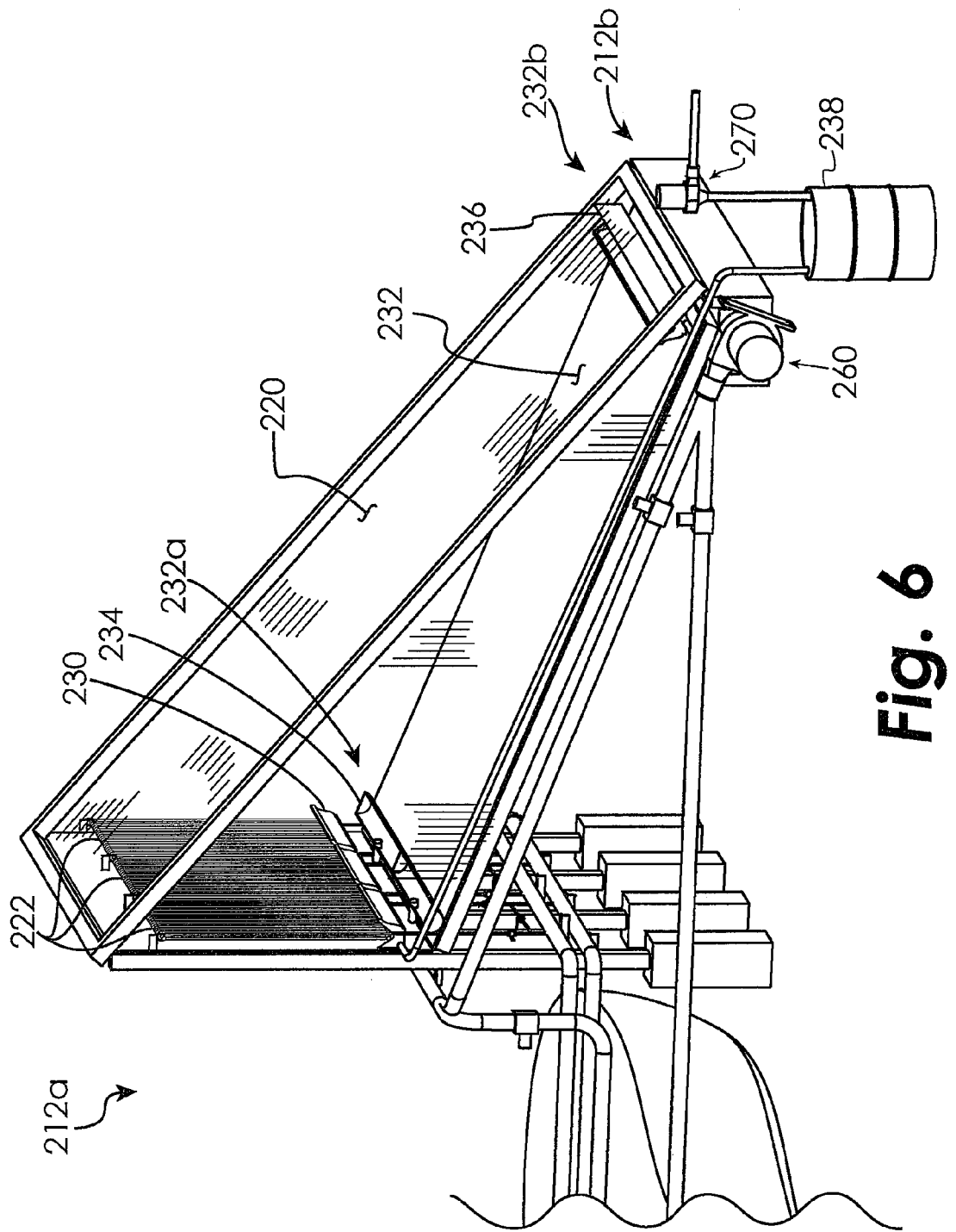
FIG. 6 is a close-up perspective view of a portion of the distillation system of FIG. 4.

System 200 may optionally include means for collecting potable water which condenses on the solar light-transmitting rooftop, such as canopy 220. In the illustrated embodiment, the system 200 includes a bottom gutter 236 positioned alongside the canopy 220, on the inside thereof, at or near end 212b of still 212, as best illustrated in FIG. 6. However, it should be appreciated that the use of gutter 236 is just one non-limiting example of the numerous possible mechanisms which could be incorporated into system 200 to collect potable water from the canopy or other appropriate roof-top member. In use, as potable water condenses on the inside of the canopy 220, the water droplets travel down canopy 220 and drip into the collection gutter 236. The gutter 236 may be composed of an appropriate material as would occur to one of ordinary skill in the art. Additionally, the sizing and configuration of the gutter 236 are not critical to the present disclosure.

In the illustrated embodiment, the recovered potable water collected in trough 230 and gutter 236 is collected in a potable water collector 238. In certain embodiments, collector 238 may be configured as a drum or storage tank configured for the collection of water. In the illustrated embodiment, one or more pipes 239 collect water from troughs 230 and gutter 236 and transfer the water to collector 238 via a gravity feed. However, it should be appreciated that the potable water may be transported to collector 238 in a variety of other appropriate manners as would occur to one of ordinary skill in the art. Additionally, it should be appreciated that the sizing, positioning and configuration of collector 238 can be varied from the illustrated example in numerous appropriate manners as would occur to one of ordinary skill in the art. In alternative embodiments, collector 238 is absent and potable water is collected and distributed in other appropriate manners, such as through direct distribution means.

Additionally, system 200 may optionally include a mechanism for collecting the non-potable water flowing down heating surface 232. In the particular illustrated embodiment, system 200 may include a non-potable water collector 240 positioned at or near lower exit end 232b of heating surface 232 (see FIG. 8). Similar to troughs 230 and collector 236, the illustrated collector 240 is configured as an open gutter or trough configured to collect non-potable water. In certain embodiments, non-potable water flowing down heating surface 232 toward exit end 232b will flow directly into collector 240. In other embodiments, one or more pipes or conduits may be used to transport the water from the heating surface into the collector. As illustrated, collector 240 may be positioned in or on the ground support member 218. It is contemplated that the sizing, positioning and configuration of collector 240 can be varied from the illustrated example in numerous appropriate manners as would occur to one of ordinary skill in the art.

System 200 may include one or more subsystems for the transport of non-potable and potable water, as best shown in FIG. 4. The subsystems may include one or more pumps, pipes, transfer conduits and/or valves, or a combination of two or more of such items, to transport water. Additionally, in certain embodiments, the subsystems may communicate with the cold water reservoir 202 and the hot water reservoir 204. The arrangement of the particular subsystems shown in the accompanying illustrations is just one non-limiting example of the numerous possible arrangements of subsystems which may be utilized to transport water in conjunction with the present system. In some situations, system 200 may be powered using only wind and solar power, by using wind energy to power the various pump subsystems associated with system 200.

In certain embodiments, system 200 includes an intake pump subsystem 250 for pumping non-potable water into the solar still 212, a recycle pump subsystem 260 for pumping non-potable water from the lower exit end 232b of heating surface 232 either back up to the upper end 232a of heating surface 232 or to the cold water pond, and a potable water pump subsystem 270 for pumping the recovered potable water to a desired location for storage and/or use. Intake pump subsystem 250 includes inlet conduits for pulling in non-potable water from water environments, such as the illustrated cold and hot water reservoirs, and further includes an outlet conduit 251 for transporting non-potable water from the hot water reservoir into distributor 234 for release onto the upper end 232a of heating surface 232 during an night cycle and a conduit 252 coupled to intake segments 222a of tubular members 222 for transporting non-potable from the cold water reservoir into tubular members 222 during a day cycle. In certain embodiments, the inlet conduits of the pump itself may include one or more filtering devices, such as suction screens, to filter the incoming non-potable water as desired. It should be appreciated that the intake pump subsystem 250 can be configured and arranged in other manners as would occur to one of ordinary skill in the art.

Additionally, potable water pump subsystem 270 includes an inlet coupled to potable water collector 238 to pull the potable water collected from troughs 230 and gutter 236 and an outlet to pump the recovered potable water to a desired location. It should be appreciated that the potable water pump subsystem 270 can be configured and arranged in other embodiments than as illustrated, as would occur to one of ordinary skill in the art.

Recycle pump subsystem 260 may optionally be incorporated into system 200 as a mechanism to recycle non-potable water flowing down heating surface 232 within the solar still 212. In the particular illustrated embodiment, subsystem 260 includes a inlet conduit coupled to non-potable water collector 240, and further includes an outlet conduit 261 leading to distributor 234 to recycle the water back onto the heating surface 232 during a day cycle and a purge conduit 262 leading to the cold water reservoir to purge non-potable water during a night cycle. In certain embodiments, conduit 261 may be joined or coupled with conduit 251 to transport water to the top of the heating surface to be released into distributor 234. However, it should be appreciated that the configuration of subsystem 260 can vary as would occur to one of ordinary skill in the art, with the specific illustrated configuration being just one non-limiting example.

In certain embodiments, recycle pump subsystem 260 may be selectively activated to recycle the water only at certain times as desired and/or to recycle only a portion of the amount of water. As such, in some embodiments only a portion of the water flowing down heating surface 232 is recycled back up to the distributor 234 via recycle pump subsystem 260. In other embodiments, none of the water flowing down heating surface 232 is recycled within the solar still 212 and the water is purged to the cold or hot water reservoir or another appropriate location as would occur to one of ordinary skill in the art, for example the cold water reservoir via conduit 262.

System 200 may also include a means for purging all or a portion of the non-potable water exiting the tubular members to a water environment. In the particular illustrated embodiment, purge conduit 280 is engaged or coupled with exit segments 222b of tubular members 222 to purge all or a portion of the non-potable water exiting the tubular members 22 into the hot water reservoir 204. It should be appreciated that other arrangements for purging water from the tubular members are contemplated, the particular illustrated arrangement being just one non-limiting example.

Although only one example arrangement of system 200 is shown in the accompanying figures, it should be appreciated that other appropriate arrangements are contemplated by the present disclosure, the various possible arrangements being too numerous to illustrate. Additionally, although only one example size and configuration of solar still 212 is illustrated, of course solar still 212 may be sized and configured in numerous possible other ways as would occur to one of ordinary skill in the art and dependent upon the desired quantity of potable water to be recovered. In certain embodiments, system 200 is sized and configured to recover large quantities of potable water.

Additionally, the still contemplated by the present disclosure may be composed of one or more sections, each section having at least one canopy, at least one heating surface, and at least one tubular member, among other components arranged as discussed above. Multiple sections may be joined together in appropriate manners to create larger stills recovering larger quantities of potable water. The modular nature of the sections of the still contemplated by the present disclosure allows for great flexibility in scaling capacity of the still to a particular environment, whether a community of a few homes or a larger city. In certain embodiments, the still section illustrated in FIGS. 4-8 may be joined with one or more other still sections of the same size and configuration to derive additional potable water. The additional still sections may transfer water in and out of the cold and water reservoirs 202 and 204, respectively, or may be provided with their own cold and hot water reservoirs for non-potable water storage.

As mentioned above, system 200 including still 212 may be utilized in conjunction with a day and night cycled arrangement to drive potable water. However, it should be appreciated that in certain embodiments still 212 may be utilized with respect to only a day or heated cycle to produce potable water.

Generally referring to FIGS. 4-8, implementation, operation and use of system 200 will now be discussed in greater detail with respect to the day and night cycled arrangement disclosed herein with respect to the flow charts of FIGS. 2 and 3. During operation of the day cycle of process 200, cold non-potable water, such as salt water, is drawn into the still 212 from cold water reservoir 202, at step 102. In the illustrated embodiment, water is drawn from cold water reservoir 202 via intake pump subsystem 250 through conduit 252. As discussed above, the cold non-potable water is pumped through the solar-heated still structure within the one or more tubular members, such as the illustrated tubular members 222, at step 104. As the cold water passes through the tubular members, the water temperature rises due to conduction through the tubular members and correspondingly draws heat from the tubular members, thereby cooling the outer surfaces of the tubular members. The non-potable water then exits the tubular members, with all or a majority of the water being directed to the hot water reservoir 204 at step 108, for example via transport through purge pipe 280. The output of heated non-potable water purged to the hot water reservoir is a byproduct from the operation of system 200 during the day cycle. The hot water reservoir 204 is preferably arranged to maintain the heat of the water and/or to increase water temperature through solar heating during the day. In certain embodiments, a greenhouse type of structure can enclose the hot water reservoir to contain, maintain, and increase the temperature of the hot water.

In certain embodiments, a small portion of the non-potable water exiting the tubular members is transported into distributor 234 for release onto the heating surface 234 at or near upper end 234*a*, at step 106, to create gravitational flow of non-potable water along the heating surface. In alternative embodiments, water may be drawn from a hot water reservoir and released onto the heating surface to create non-potable water flow along the heating surface. The heating surface 232, heated by solar energy, further raises the temperature of the non-potable water flowing therealong, causing a portion of the water to evaporate within the enclosed still structure. When the evaporated water encounters the colder surfaces of tubular members 222 and/or the canopy inside surfaces, vapor condenses on the surfaces as cooler, potable water. The condensed water preferably is collected in troughs 230 and/or gutter 236 and transported out of the still via an output conduit system for use. In the particular illustrated example, the potable water may be transported into potable water collector 238 via pipe(s) 239 and further transported as desired using subsystem 270.

The non-potable water which travels to the lower end of the heating surface 232 during the day cycle may be returned to the raised end of the heating surface to be recycled within the still to yield additional water, as represented by numeral 110 in FIG. 2. In the particular illustrated example, recycle subsystem 260 may be used to accomplish the recycling of non-potable water within the still 212, with the non-potable water in collector 240 being transported through conduit 261 to the upper end 232*a* of the heating surface 232. During the day cycle, the portion of the non-potable water flow which is newly introduced at the upper end of the heating surface 232 may be controlled to mix with and dilute the recycled non-potable water in the still to maintain the salinity of the non-potable water flow along the heating surface so that the salinity does not exceed a desired concentration. In alternative embodiments, only a portion of the non-potable water traveling along the heating surface 232 is recycled within the still, with the remaining non-potable water being purged to a hot water reservoir.

At the end of a day cycle, the input of cold non-potable water from the cold water reservoir is discontinued typically in conjunction with a substantial drop in temperature of the ambient air, for example due to sundown. Thereafter, the night cycle portion of process 100 begins. In certain embodiments, the transition between the day and night cycle involves a minimal or insubstantial break in the process flow. In other embodiments, a substantial break in process flow may occur at the transition between the day and night cycles.

During operation of the night cycle of process 100 (see FIG. 3), heated non-potable water from the hot water reservoir 204 is fed into to the solar distillation still 212 at step 112, such as by pumping or using a gravity flow, for example using intake pump subsystem 250. The heated water is introduced at the upper end of the still 212 onto the upper end 232*a* of heating surface 232, at step 114 in FIG. 3, and is distributed to travel downward along the heating surface as a result of gravitational force. In the particular illustrated embodiment, hot non-potable water may be transported through conduit 251 and released into liquid distributor 234 for distribution across the width of the heating surface. Heating surface 32 is not heated at this point. Due to the substantial change in ambient temperature after the sun goes down or otherwise due to a reduction in heat, the heated water travelling through the still 212 now has a temperature substantially above the temperature of the cooler air outside the still. As the heated water travels downward along heating surface 232, the temperature differential causes further evaporation of potable water within the still. The evaporated potable water can be captured as condensation on the cooled surfaces of the roof and walls of canopy 220 and potentially as condensation upon the cooled surfaces of tubular members 222. After passing through the still, the remaining non-potable water, at a cooler temperature, is collected at the bottom of the heating surface and directed to a cold water reservoir 202 at step 118, optionally using pumping or a gravity flow. In the particular illustrated embodiment, the non-potable water collects in collector 240 and is transported using pump subsystem 260 through conduit 262 into cold water reservoir 202. In certain alternative embodiments, the cooler water can be directly discharged or purged as waste from the process to a different location. In other alternative embodiments, a portion of the water at the bottom of the heating surface can be recycled within the still 212 and returned for distribution at the top of the heating surface, as shown at numeral 116 in FIG. 3.

In certain embodiments, cool or cold water in the cold water reservoir 202 will continue to cool during the night time hours and can optionally be encouraged to remain at a lower temperature, for example using insulation or shade when the day time begins and ambient temperatures begin to rise. During the next day cycle, the cooled water can optionally be fed back into the solar still as input, beginning again at step 102 in FIG. 2. The day and night cycles may continue in a cycled arrangement for a determined length of time, until a desired quantity of potable water has been received, and/or until a desired salt concentration or scaling compound concentration in the non-potable water has been reached. In other embodiments, the cycled arrangement may continue for an indeterminate length of time.

During operation of system 200 to recover potable water, the still 212 may be orientated such that heating surface 232 faces a southward direction, in other words with the non-potable water along surface 232 flowing from north to south. In this orientation, the still is able to maximize solar energy capture along the heating surface. To that end, it may also be beneficial to reduce or minimize the occurrence of shadow effect along the heating surface, so that as much of the heating surface as possible is exposed to solar energy. To reduce or minimize the shadow effect along the heating surface, it is correspondingly necessary to reduce or minimize the number of components positioned above the heating surface which may interfere with solar energy reaching the heating surface. The positioning of the tubular members and collection trough along an end of the heating surface may assist in accomplishing this.

References made herein to a cold water source, such as cold water reservoir 202, are meant to cover a variety of appropriate water sources or supplies, man-made or naturally occurring, which house or contain water a relatively low temperature. Additionally, references made herein to a hot water source, such as hot water reservoir 204, are meant to cover a variety of appropriate water sources or supplies, man-made or naturally occurring, which house or contain water a relatively high temperature. The average temperature of water in the hot water source is higher than the average temperature of water in the cold water source. The water sources may contain water in dynamic and/or static states, or a combination of the two. In certain embodiments, the water sources may be positioned in relatively close proximities to the corresponding still to reduce the amount of energy and resources required to pump water between the still and the water sources. References made herein to any of pumping, transporting, directing, and/or passing water are intended to cover any and all appropriate means of initiating and/or maintaining water flow through conduits.

As mentioned above, the steps of process 100 may be controlled as desired or programmed, optionally using manual or automated controls. Automated controls can optionally be time or light controlled or may be associated with sensors to start or stop certain steps of the process based on sensed conditions such as the temperatures or salinity concentrations of the water reservoirs, the ambient temperature or an algorithm based on the temperature differentials between one or more of the relevant water reservoirs, the still and the ambient temperature. A controller may also incorporate sensors and/or control commands to control the valves and to prohibit undesirable combinations of valve and pump flows.

In certain embodiments, system 200 may include arrangements, such as pumps, to recycle non-potable water within system 200 within the day or night cycle period to further heat or cool the water and to correspondingly increase the potable water yield. However, the efficiency of the potable water yield will decrease as the temperature differential decreases and as the concentration of non-potable elements, such as salinity, of the non-potable water increases.

In certain embodiments, it may be desirable to purge and/or replenish water within the system 200 due to the increase in concentrations of scaling compounds and/or salinity in the non-potable water. More specifically, after each cycle or process portion, the non-potable water in the hot and/or cold water reservoir will likely have a higher concentration of scaling compounds and/or a higher salinity concentration than the initial non-potable water entering the still. If not diluted with new water, the salinity content and/or concentrations of scaling compounds will continue to rise with each cycle or process portion, creating a limit on a desirable number of cycles before maximum useful concentrations are reached. At that point, if not before, the non-potable water may be discharged, diluted and/or replenished with new water. In certain embodiments, it is preferable to purge and/or replenish non-potable water at the coldest point possible or practical to conserve or retain as much heat energy or solar energy as possible within the system. As one example, non-potable water may be periodically removed from the cold water reservoir and purged or otherwise discharged as waste to an appropriate location, with new non-potable water added to the cold water reservoir to replenish the supply. In other embodiments, it may also be desirable to purge non-potable water to assist in controlling the total liquid levels within the process, including the still and the hot and cold water reservoirs.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A process for distillation to recover potable water, comprising:
   providing a solar distillation still having a light-transmitting roof top with an inside surface, a water transport tube with an outside surface, an inlet and an outlet, a potable water collection device positioned below and aligned with the tube such that potable water condensing on the outside surface of the tube will drip into the collection device, and an inclined heating surface positioned underneath the roof top and adapted for receiving a flow of non-potable water therealong, the heating surface having an upper end and a lower end;
   operating the solar distillation still through a cycled arrangement alternating between a day cycle and a night cycle;
   wherein the day cycle includes:
   drawing non-potable water from a cold water environment at a first temperature;

directing the non-potable water from the cold water environment into the inlet of the tube and passing the non-potable water through the tube;

releasing a first portion of the non-potable water exiting the tube onto the heating surface at the upper end so that the first portion of non-potable water flows down the heating surface toward the lower end, whereby the non-potable water flowing down the heating surface is solar heated to a second temperature, higher than the first temperature, and a portion of the non-potable water evaporates, condenses as potable water on the outside of the tube, and drips into the potable water collection device; and continually recycling the remaining non-potable water along the heating surface;

wherein the night cycle includes:

drawing non-potable water from a hot water environment at a third temperature higher than at least the first temperature;

releasing the non-potable water from the hot water environment onto the heating surface at the upper end so that the non-potable water flows down the heating surface toward the lower end, whereby a portion of the non-potable water evaporates, condenses on one or both of the outside surface of the tube and the inside surface of the roof top to be collected as potable water; and directing the remaining non-potable water at the lower end of the heating surface to the cold water environment.

2. The process of claim 1, wherein the day cycle further includes transporting a second portion of the non-potable water exiting the tube to the hot water environment.

3. The process of claim 1, wherein the day cycle occurs during daylight hours when the sun is visible.

4. The process of claim 1, wherein the process continues substantially uninterrupted from the day cycle to the night cycle when the sun disappears below the horizon.

5. The process of claim 1, further comprising replenishing non-potable water in the cold water environment based on the concentration of at least one scaling compound reaching an undesirable level.

6. The process of claim 1, further comprising replenishing non-potable water in the cold water environment based on the salinity concentration reaching an undesirable level.

7. The process of claim 1, wherein the still further includes a liquid distributor positioned adjacent the upper end of the heating surface, wherein the liquid distributor is configured to distribute water across the heating surface, and wherein the releasing includes directing the non-potable water into the liquid distributor for release onto the heating surface.

8. The process of claim 1, wherein the roof top is a canopy composed of a transparent plastic material and is secured in an air tight manner.

9. The process of claim 1, wherein the still further includes at least one gutter trough positioned adjacent the inside surface of the roof top and configured to collect potable water that has condensed on the inside surface of the roof top.

10. The process of claim 1, wherein the condensing tube extends in an undulating fashion within the still.

11. A process for distillation to recover potable water, comprising:

providing a solar distillation still having a light-transmitting canopy, a condensing element, a potable water collection device configured to collect potable water condensing on the condensing element, and a heating surface adapted for receiving a flow of non-potable water therealong, wherein the heating surface is positioned underneath the canopy;

operating the solar distillation still through a cycled arrangement alternating between a day cycle and a night cycle;

wherein the day cycle includes:

maintaining the condensing element at an average first temperature;

releasing a flow of non-potable water at onto the heating surface, whereby the non-potable water flowing along the heating surface is solar heated to an average second temperature and a portion of the non-potable water evaporates, condenses on the condensing element to be collected as potable water, and is collected in the potable water collection device, the average second temperature being higher than the average first temperature;

wherein the night cycle includes:

releasing a flow of non-potable water at an average third temperature onto the heating surface, the average third temperature being higher than at least the average first temperature, whereby a portion of the non-potable water evaporates and condenses on the canopy to be collected as potable water, wherein the temperature of the canopy during the night cycle is lower than the average third temperature to enable the evaporation and condensation to occur.

12. The process of claim 11, wherein the maintaining the condensing element at an average first temperature includes drawing non-potable water from a cold water environment and passing the non-potable water from the cold water environment through the condensing element.

13. The process of claim 12, wherein the releasing non-potable water during the day cycle includes releasing a portion of the non-potable water exiting the condensing element onto the heating surface.

14. The process of claim 11, wherein the heating surface is inclined and includes an upper end and a lower end, wherein the flow of non-potable water along the heating surface includes gravitational flow from the upper end to the lower end, wherein day cycle further includes continually recycling the remaining non-potable water along the heating surface.

15. The process of claim 11, wherein the night cycle further includes directing the remaining non-potable water from the heating surface to a cold water environment.

16. The process of claim 11, wherein night cycle further includes, prior to the releasing, drawing the non-potable water at the third temperature from a hot water environment.

17. The process of claim 11, wherein the condensing element is a tubular member extending in an undulating fashion within the still.

* * * * *